United States Patent
Koike et al.

(10) Patent No.: US 11,028,015 B2
(45) Date of Patent: Jun. 8, 2021

(54) GLASS BALL HAVING SPECIFIC YOUNG'S MODULUS AND COEFFICIENT OF THERMAL EXPANSION

(71) Applicant: AGC Inc., Chiyoda-ku (JP)

(72) Inventors: Akio Koike, Tokyo (JP); Makoto Katsuta, Tokyo (JP); Suguru Murayama, Tokyo (JP); Kenji Imakita, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/729,839

(22) Filed: Dec. 30, 2019

(65) Prior Publication Data
US 2020/0131086 A1 Apr. 30, 2020

Related U.S. Application Data

(63) Continuation of application No. PCT/JP2018/023403, filed on Jun. 20, 2018.

(30) Foreign Application Priority Data

Jul. 4, 2017 (JP) .................... 2017-131095

(51) Int. Cl.
| | | |
|---|---|---|
| *C03C 3/083* | (2006.01) | |
| *B32B 5/16* | (2006.01) | |
| *C03C 21/00* | (2006.01) | |
| *C03C 3/062* | (2006.01) | |
| *C03C 3/085* | (2006.01) | |
| *C03C 3/087* | (2006.01) | |
| *F16C 33/32* | (2006.01) | |

(52) U.S. Cl.
CPC ............ *C03C 21/002* (2013.01); *C03C 3/062* (2013.01); *C03C 3/083* (2013.01); *C03C 3/085* (2013.01); *C03C 3/087* (2013.01); *F16C 33/32* (2013.01); *C01P 2004/32* (2013.01); *C01P 2006/10* (2013.01); *C01P 2006/32* (2013.01)

(58) Field of Classification Search
CPC ... C03C 3/083; C03C 3/095; Y10T 428/2982; C01P 2004/32; C01P 2006/10; C01P 2006/32; C01P 2006/90
See application file for complete search history.

(56) References Cited

U.S. PATENT DOCUMENTS

| 6,345,915 | B1 | 2/2002 | Obara | |
|---|---|---|---|---|
| 2002/0044704 | A1 | 4/2002 | Obara | |
| 2002/0097937 | A1* | 7/2002 | Obara | ..................... F16C 33/62 384/492 |
| 2007/0053069 | A1 | 3/2007 | Yagyu et al. | |
| 2008/0020919 | A1 | 1/2008 | Murata | |
| 2010/0035745 | A1 | 2/2010 | Murata | |
| 2010/0087307 | A1 | 4/2010 | Murata et al. | |
| 2011/0014475 | A1 | 1/2011 | Murata | |
| 2017/0197869 | A1* | 7/2017 | Beall | ....................... C03C 3/087 |
| 2017/0345699 | A1* | 11/2017 | Katayama | ............... C03C 3/091 |

FOREIGN PATENT DOCUMENTS

| JP | 6-280880 A | 10/1994 |
|---|---|---|
| JP | 11-60283 A | 3/1999 |
| JP | 2001-27251 A | 1/2001 |
| JP | 2007-72263 A | 3/2007 |
| JP | 2008-1590 A | 1/2008 |
| JP | 2008-115072 A | 5/2008 |
| JP | 2009-13052 A | 1/2009 |
| JP | 2009-84076 A | 4/2009 |
| JP | 2017-15147 A | 1/2017 |

OTHER PUBLICATIONS

International Search Report dated Sep. 4, 2018 in PCT/JP2018/023403 filed Jun. 20, 2018, citing documents AC-AH and AP-AV therein, 2 pages.

* cited by examiner

*Primary Examiner* — Hoa (Holly) Le
(74) *Attorney, Agent, or Firm* — Oblon, McClelland, Maier & Neustadt, L.L.P.

(57) ABSTRACT

A glass ball has a density of 2.3 to 3.2 g/cm³, a Young's modulus of 60 to 150 GPa, and an average coefficient of thermal expansion at 50 to 350° C. being $40 \times 10^{-7}$ to $120 \times 10^{-7}/°$ C. The glass ball is formed of a glass material including, as represented by mole percentage based on oxides, 30 to 75 mol % of $SiO_2$, 2 to 30 mol % of $Al_2O_3$, and 5 to 25 mol % of $R_2O$, where R is at least one kind selected from Li, Na and K. The glass ball includes a compressive stress layer in a surface thereof.

10 Claims, No Drawings

GLASS BALL HAVING SPECIFIC YOUNG'S MODULUS AND COEFFICIENT OF THERMAL EXPANSION

TECHNICAL FIELD

The present invention relates to a glass ball, and particularly relates to a glass ball suitable as a ball for a rolling bearing (ball bearing).

BACKGROUND ART

Ball bearings for supporting rotating shafts are generally mounted on driving portions of various devices. In the background art, balls made of a metal such as a steel have been used broadly for balls and bearings used in such ball bearings.

However, when heavy balls made of a steel or the like are used in a ball bearing rotating at a high speed, large centrifugal force is generated so that there is a fear that the bearing may be broken. To solve this problem, a technique of manufacturing hollow balls in order to reduce the weight is known (see Patent Literature 1). On the other hand, when balls are made of a metal in a ball bearing used near an inverter motor or the like, a high-frequency current generated from the inverter motor may flow into the bearing. Thus, there is also a fear that the bearing may be broken due to the high-frequency current.

To solve this problem, bearing balls having light weight and insulation properties are required. Balls made of ceramics such as silicon nitride can have high strength in spite of reduction in weight, and thus, the balls made of ceramics have been discussed (see Patent Literature 2).

CITATION LIST

Patent Literature

Patent Literature 1: JP H06-280880 A
Patent Literature 2: JP 2007-72263 A

SUMMARY OF INVENTION

Technical Problem

Balls made of ceramics can be easily made lighter in weight than balls made of a metal, as described above. In addition, the balls made of ceramics have insulation properties. Therefore, it is worth considering the application of the balls to the aforementioned inverter air-conditioner. However, the balls made of ceramics, particularly silicon nitride, are so high in hardness that they cannot be processed easily. Therefore, labor and cost are increased to manufacture bearing balls required to have a desired shape and desired dimensions precisely. Thus, it is difficult to manufacture the balls efficiently.

Therefore, an object of the present invention is to provide a glass ball which has light weight and insulation properties, can ensure strength sufficiently, and can be processed into a desired shape or manufactured easily with good productivity.

Solution to Problem

The present inventors made extensive and intensive investigations. As a result, they found that the aforementioned problem can be solved by a sphere (glass ball) made of glass and having a predetermined composition and properties. Thus, the present invention has been completed.

That is, the glass ball in the present invention has:
a density of 2.3 to 3.2 g/cm$^3$;
a Young's modulus of 60 to 150 GPa; and
an average coefficient of thermal expansion at 50 to 350° C. being $40\times10^{-7}$ to $120\times10^{-7}$/° C.,
the glass ball is formed of a glass material comprising, as represented by mole percentage based on oxides, 30 to 75 mol % of $SiO_2$, 2 to 30 mol % of $Al_2O_3$, and 5 to 25 mol % of $R_2O$, wherein R is at least one kind selected from Li, Na and K, and
the glass ball comprises a compressive stress layer in a surface thereof.

Advantageous Effects of Invention

In the present invention, a glass ball having light weight, insulation properties and sufficient strength can be provided. The glass ball is suitable as a ball for a ball bearing (particularly a ball for a ball bearing for use in a device including an inverter circuit). In addition, the glass ball can be easily manufactured so that the manufacturing cost can be reduced while the productivity can be improved.

DESCRIPTION OF EMBODIMENTS

The glass ball in the present invention is described below in detail with reference to its embodiments. However, the present invention is not limited to the following embodiments, which may be modified desirably to carry out the present invention without departing from the gist thereof.

In the present description, the phrase "glass material" means a glass which has not been subjected to a strengthening treatment. In addition, the word "to" designating a numerical range is used as a denotation of a range including numerical values on both sides of the word "to" as a lower limit and upper limit of the range.

First Embodiment

[Glass Ball]
A glass ball in a first embodiment has a configuration as described above. The glass ball has a density of 2.3 to 3.2 g/cm$^3$, a Young's modulus of 60 to 150 GPa, and an average coefficient of thermal expansion at 50 to 350° C. being $40\times10^{-7}$ to $120\times10^{-7}$/° C. The glass ball is formed of a glass material containing, as represented by mole percentage based on oxides, 30 to 75 mol % of $SiO_2$, 2 to 30 mol % of $Al_2O_3$, and 5 to 25 mol % of $R_2O$ (where R is at least one kind selected from Li, Na and K). The glass ball includes a compressive stress layer in a surface thereof.

<Glass Composition>
The glass composition of a glass material used in the embodiments means a glass composition which has not been subjected to a strengthening treatment. When a chemically strengthening treatment is used as the strengthening treatment, the glass composition in a surface thereof is changed slightly due to ion exchange. However, even when a compressive stress layer is formed by the chemically strengthening treatment, a major part of a glass is normally a part which is an inner part from the compressive stress layer and which has not been subjected to the strengthening treatment and has a tensile stress (hereinafter also referred to as a tensile stress part). In the glass which has been subjected to a strengthening treatment, the composition of the tensile stress part is the same as the composition of the glass (the glass composition of the glass material) which has not been subjected to the strengthening treatment.

Here, in a simplified manner, a composition of a glass can be obtained by semi-quantitative analysis based on a fluorescent X-ray method. More accurately, the composition of the glass can be measured by a wet analysis method such as ICP emission analysis. Contents of respective components are expressed by mole percentage (mol %) based on oxides, and represented by "%" below unless specifically mentioned. The components constituting the glass composition is described specifically below.

The glass material constituting the glass ball in the embodiment contains, as represented by mole percentage based on oxides, 30 to 75% of $SiO_2$, 2 to 30% of $Al_2O_3$, and 5 to 25% of $R_2O$ (where R is at least one kind selected from Li, Na and K). The glass material used here is preferably a material with which a compressive stress layer can be formed in a glass surface by a strengthening treatment, and a material with which a compressive stress layer can be formed by a chemically strengthening treatment.

$SiO_2$ is a component that forms a network of the glass. In addition, $SiO_2$ is a component that enhances the chemical durability, and is a component that reduces occurrence of cracks when the glass surface is scratched (indented).

The content of $SiO_2$ is 30% or higher. In order to obtain the aforementioned properties effectively, the content of $SiO_2$ is preferably 35% or higher, more preferably 45% or higher, even more preferably 50% or higher, and particularly preferably 60% or higher. On the other hand, when the content of $SiO_2$ exceeds 75%, the meltability tends to decrease. Therefore, the content of $SiO_2$ is 75% or lower, preferably 70% or lower, and more preferably 68% or lower.

$Al_2O_3$ is a component that improves the Young's modulus and the hardness, and a component required when the ball is used as a ball for a ball bearing. In addition, $Al_2O_3$ is a component effective for improving ion exchange performance in chemical strengthening and increases a surface compressive stress after the strengthening. Further, $Al_2O_3$ is a component that increases the glass transition point (Tg) of the glass, and is also a component that makes it difficult to reduce the compressive stress even when a treatment is performed for a long time in order to increase the compressive stress depth in the chemical strengthening.

The content of $Al_2O_3$ is 2% or higher. In order to obtain the aforementioned properties effectively, the content of $Al_2O_3$ is preferably 2.5% or higher. On the other hand, when the content of $Al_2O_3$ exceeds 30%, the acid resistance of the glass tends to deteriorate, or the devitrification temperature tends to rise. Therefore, the content of $Al_2O_3$ is 30% or lower. In addition, there is a fear that the viscosity of the glass may increase and the meltability may be reduced. Therefore, the content of $Al_2O_3$ is preferably 27% or lower, more preferably 20% or lower, even more preferably 15% or lower, and particularly preferably 10% or lower.

$R_2O$ (where R is at least one kind selected from Li, Na and K) is a component for forming a surface compressive stress layer in the glass surface by ion exchange, and is a component that improves anti-frangibility of the chemically strengthened glass. The total content of those components ($Li_2O+Na_2O+K_2O$) is 5% or higher, preferably 8% or higher, more preferably 10% or higher, and even more preferably 12% or higher. On the other hand, when the content of $R_2O$ exceeds 25%, the acid resistance of the glass tends to deteriorate. Therefore, the content of $R_2O$ is 25% or lower. The content of $R_2O$ is preferably 20% or lower, and more preferably 18% or lower.

$Li_2O$ is a component useful for obtaining a glass ball having light weight, insulation properties and sufficient strength, and for increasing the Young's modulus while keeping the density low. In addition, $Li_2O$ is a component used for forming a surface compressive stress layer in the glass surface by ion exchange, and is a component that improves the abrasion resistance of the glass. When a chemically strengthening treatment is performed by ion exchange between Li ions in the glass surface and Na ions, the content of $Li_2O$ is preferably 2% or higher, more preferably 3% or higher, even more preferably 5% or higher, and particularly preferably 7% or higher. On the other hand, when the content of $Li_2O$ exceeds 20%, the acid resistance of the glass tends to deteriorate. Therefore, the content of $Li_2O$ is preferably 20% or lower, and more preferably 17% or lower.

$Na_2O$ is a component that forms a surface compressive stress layer by ion exchange and improves the meltability of the glass. Although $Na_2O$ does not have to be contained, $Na_2O$ can promote ion exchange between Li ions in the glass surface and Na ions. Therefore, when $Na_2O$ is contained, the content of $Na_2O$ is preferably 1% or higher. The content of $Na_2O$ is more preferably 2% or higher, and even more preferably 3% or higher. On the other hand, the content of $Na_2O$ exceeds 8%, there is a fear that the surface compressive stress formed by the ion exchange may be lowered. The content of $Na_2O$ is preferably 8% or lower, more preferably 7% or lower, even more preferably 6% or lower, particularly preferably 5% or lower, and most preferably 4% or lower.

When the ion exchange between Li ions in the glass surface and Na ions and the ion exchange between Na ions and K ions are performed concurrently in the strengthening treatment by a method such as immersion in mixed molten salt of potassium nitrate and sodium nitrate, the content of $Na_2O$ is further more preferably 7% or lower, particularly preferably 6% or lower, and most preferably 5% or lower. On the other hand, the content of $Na_2O$ is preferably 2% or higher, more preferably 3% or higher, and even more preferably 4% or higher.

$K_2O$ may be contained for improvement of the ion exchange performance and the like. When $K_2O$ is contained, the content of $K_2O$ is preferably 0.5% or higher, more preferably 1% or higher, even more preferably 2% or higher, and particularly preferably 3% or higher. On the other hand, when the content of $K_2O$ exceeds 10%, the Young's modulus is lowered. Therefore, the content of $K_2O$ is preferably 10% or lower. The content of $K_2O$ is more preferably 8% or lower, even more preferably 6% or lower, particularly preferably 4% or lower, and most preferably 2% or lower.

In addition, as the glass composition of the glass material, various optional components other than the aforementioned components may be contained as long as they do not impede the effect in the embodiment. Here, examples of the optional components include the following components.

$B_2O_3$ is a component that reduces the brittleness of the glass ball and improves the meltability. $B_2O_3$ is not essential. When $B_2O_3$ is contained, the content of $B_2O_3$ is preferably 0.5% or higher, more preferably 1% or higher, and even more preferably 2% or higher in order to improve the meltability. On the other hand, when the content of $B_2O_3$ exceeds 5%, the acid resistance tends to deteriorate. Therefore, the content of $B_2O_3$ is preferably 5% or lower, more preferably 4% or lower, and even more preferably 3% or lower. In addition, in order to prevent the quality of the glass from easily deteriorating due to striae generated during melting, the content of $B_2O_3$ is preferably 1% or lower, more preferably 0.5% or lower, and even more preferably 0.1% or lower. Further, $B_2O_3$ is preferably substantially not contained.

The phrase "substantially not contained" means not to be contained except for unavoidable impurities. In the present invention, the content of the unavoidable impurities is, for example, 0.01% or lower (the same applies below).

$P_2O_5$ is a component that reduces the ion exchange performance and the brittleness. $P_2O_5$ does not have to be contained. When $P_2O_5$ is contained, the content of $P_2O_5$ is preferably 0.5% or higher, more preferably 1% or higher, and even more preferably 2% or higher. On the other hand, when the content of $P_2O_5$ exceeds 6%, the compressive stress in the glass which has been subjected to the chemically strengthening treatment (hereinafter also referred to as "chemically strengthened glass") is reduced, and the acid resistance is also reduced. Therefore, the content of $P_2O_5$ is preferably 6% or lower, more preferably 4% or lower, and even more preferably 3% or lower. In addition, in order to prevent the quality of the glass from easily deteriorating due to striae generated during melting, the content of $P_2O_5$ is preferably 1% or lower, more preferably 0.5% or lower, and even more preferably 0.1% or lower. Further, $P_2O_5$ is preferably substantially not contained.

CaO is a component that improves the meltability of the glass, and is also a component that improves the Young's modulus. CaO may be contained. When CaO is contained, the content of CaO is preferably 0.5% or higher, more preferably 1% or higher, even more preferably 2% or higher, particularly preferably 3% or higher, and most preferably 5% or higher. On the other hand, when the content of CaO exceeds 20%, the ion exchange performance is extremely lowered. Therefore, the content of CaO is preferably 20% or lower. The content of CaO is more preferably 14% or lower, even more preferably 10% or lower, particularly preferably 8% or lower, and most preferably 6% or lower.

SrO is a component that improves the meltability of the glass, and is also a component that improves the Young's modulus. SrO may be contained. When SrO is contained, the content of SrO is preferably 0.5% or higher, more preferably 1% or higher, even more preferably 2% or higher, particularly preferably 3% or higher, and most preferably 5% or higher. On the other hand, when the content of SrO exceeds 20%, the ion exchange performance is extremely lowered. Therefore, the content of SrO is preferably 20% or lower, more preferably 14% or lower, even more preferably 10% or lower, particularly preferably 8% or lower, and most preferably 6% or lower. In order to reduce the brittleness, the content of SrO is preferably 3% or lower, more preferably 0.5% or lower, and even more preferably 0.1% or less. In addition, SrO is preferably substantially not contained.

BaO is a component that improves the meltability of the glass material, and is also a component that improves the Young's modulus. BaO may be contained. When BaO is contained, the content of BaO is preferably 0.5% or higher, more preferably 1% or higher, even more preferably 2% or higher, particularly preferably 3% or higher, and most preferably 5% or higher. On the other hand, when the content of BaO exceeds 15%, the ion exchange performance is extremely lowered. Therefore, the content of BaO is preferably 15% or lower. The content of BaO is more preferably 10% or lower, even more preferably 8% or lower, and particularly preferably 6% or lower. In order to reduce the brittleness, the content of BaO is preferably 3% or lower, more preferably 0.5% or lower, and even more preferably 0.1% or less. In addition, BaO is preferably substantially not contained.

ZnO is a component that improves the meltability of the glass. ZnO may be contained. When ZnO is contained, the content of ZnO is preferably 0.25% or higher, and more preferably 0.5% or higher. On the other hand, when the content of ZnO exceeds 10%, the weather resistance of the glass is extremely lowered. Therefore, the content of ZnO is preferably 10% or lower. The content of ZnO is more preferably 7% or lower, even more preferably 5% or lower, particularly preferably 2% or lower, and most preferably 1% or lower.

$TiO_2$ is a component that improves the Young's modulus. $TiO_2$ may be contained. When $TiO_2$ is contained, the content of $TiO_2$ is preferably 0.1% or higher, more preferably 0.15% or higher, and even more preferably 0.2% or higher. On the other hand, when the content of $TiO_2$ exceeds 5%, devitrification tends to easily occur during melting, so that there is a fear that the quality of the glass may deteriorate. Therefore, the content of $TiO_2$ is preferably 5% or lower. The content of $TiO_2$ is preferably 3% or lower, more preferably 1% or lower, even more preferably 0.5% or lower, and particularly preferably 0.25% or lower.

$ZrO_2$ is a component that increases the surface compressive stress by the ion exchange, and is also a component that improves the Young's modulus. $ZrO_2$ may be contained. When $ZrO_2$ is contained, the content of $ZrO_2$ is preferably 0.5% or higher, and more preferably 1% or higher. On the other hand, when the content of $ZrO_2$ exceeds 8%, devitrification tends to easily occur during melting, so that there is a fear that the quality of the glass may deteriorate. Therefore, the content of $ZrO_2$ is preferably 8% or lower. The content of $ZrO_2$ is more preferably 6% or lower, even more preferably 4% or lower, particularly preferably 2% or lower, and most preferably 1.2% or lower.

$La_2O_3$ and $Nb_2O_5$ are components that improves the Young's modulus. Those components may be contained. When the components are contained, the content of each component is preferably 0.5% or higher, more preferably 1% or higher, even more preferably 1.5% or higher, particularly preferably 2% or higher, and most preferably 2.5% or higher. On the other hand, when the content of each of $La_2O_3$ and $Nb_2O_5$ exceeds 8%, devitrification of the glass tends to easily occur during melting, so that there is a fear that the quality of the chemically strengthened glass may deteriorate. Therefore, the content of each of $La_2O_3$ and $Nb_2O_5$ is preferably 8% or lower. The content of each of $La_2O_3$ and $Nb_2O_5$ is more preferably 6% or lower, even more preferably 5% or lower, particularly preferably 4% or lower, and most preferably 3% or lower.

Each of $Ta_2O_5$ and $Gd_2O_3$ may be contained in a small amount in order to improve the Young's modulus. However, devitrification tends to easily occur during melting, so that there is a fear that the quality of the glass may deteriorate. Therefore, when those components are contained, the content of each component is preferably 1% or lower, more preferably 0.5% or lower, and even more preferably 0.1% or lower. Further, those components are preferably substantially not contained.

$Fe_2O_3$ is a component that improves the meltability of the glass. Since $Fe_2O_3$ is a component that absorbs heat rays, $Fe_2O_3$ has an effect of promoting heat convection of the molten glass to improve the homogeneity of the glass, and preventing bottom bricks of a melting furnace from reaching high temperature, to thereby elongate the life of the furnace. $Fe_2O_3$ is preferably contained in the composition in a process of melting the glass using a large-size furnace. The content of $Fe_2O_3$ is preferably 0.002% or higher, more preferably 0.006% or higher, even more preferably 0.01% or higher, and particularly preferably 0.02% or higher. On the other hand, when $Fe_2O_3$ is excessively contained, there arises a problem due to coloring with $Fe_2O_3$. $Fe_2O_3$ in an oxidized state causes coloring in yellow, and FeO in a reduced state causes coloring in blue. Due to a balance between the both, the glass is colored in green. Therefore, the content of $Fe_2O_3$ is preferably 0.3% or lower, more preferably 0.04% or lower, even more preferably 0.03% or lower, and particularly preferably 0.025% or lower.

Further, when the glass is colored for use, coloring components may be added without impeding the attainment of desired strengthened properties. Preferred examples of the coloring components include $Co_3O_4$, $MnO_2$, $Fe_2O_3$, NiO, CuO, $Cr_2O_3$, $V_2O_5$, $Bi_2O_3$, $SeO_2$, $TiO_2$, $CeO_2$, $Er_2O_3$, and $Nd_2O_3$.

The total content of the coloring components is preferably 7% or lower, as represented by mole percentage based on oxides. When the total content exceeds 7%, devitrification of the glass tends to easily occur unfavorably. The total content is preferably 5% or lower, more preferably 3% or lower, and even more preferably 1% or lower. In order to give priority to the visible light transmittance of the glass, those components are preferably substantially not contained.

$SO_3$, chlorides, fluorides or the like may be contained moderately as clarifiers during melting of the glass. $As_2O_3$ is preferably substantially not contained. When $Sb_2O_3$ is contained, the content of $Sb_2O_3$ is preferably 0.3% or lower, more preferably 0.1% or lower, and most preferably substantially not contained.

<Glass Properties>

Here, the density ($\rho$) of the glass material used in the embodiment is 2.3 to 3.2 $g/cm^3$. The density is preferably 2.35 $g/cm^3$ or more in order to ensure strength and have chemical resistance such as acid resistance. On the other hand, the density is preferably 3.1 $g/cm^3$ or less, more preferably 2.6 $g/cm^3$ or less, and even more preferably 2.49 $g/cm^3$ in order to intend reduction in weight. Within the aforementioned range, the weight as a ball for a bearing is so light that excessive centrifugal force can be prevented from being generated during high speed rotation. Thus, force applied to a member such as the bearing can be reduced, and sufficient strength can be ensured easily so that damage on the glass ball can be avoided.

The glass material used in the embodiment has a Young's modulus (E) of 60 to 150 GPa. The Young's modulus is preferably 70 GPa or more, and more preferably 80 GPa or more in order to ensure strength and abrasion resistance. On the other hand, the Young's modulus is preferably 130 GPa or less in order to improve the acid resistance or devitrification property of the glass. The Young's modulus can be measured by a common method. The Young's modulus can be, for example, measured by an ultrasonic pulse method.

The glass material used in the embodiment has an average coefficient of thermal expansion (coefficient $\alpha$ of linear expansion) at 50° C. to 350° C. being $40\times10^{-7}$ to $120\times10^{-7}$/° C. The average coefficient of thermal expansion is preferably $50\times10^{-7}$/° C. or more, and more preferably $60\times10^{-7}$/° C. or more, in consideration of the manufacturing properties of the glass. On the other hand, the average coefficient of thermal expansion is preferably $102\times10^{-7}$/° C. or less, more preferably $85\times10^{-7}$/° C. or less, and even more preferably $75\times10^{-7}$/° C. or less, in order to ensure dimensional accuracy.

The glass ball in the embodiment is a glass ball formed of the aforementioned glass material, and a compressive stress layer is formed in a surface thereof. Due to the compressive stress layer formed in the surface, the strength of the glass ball becomes excellent, and the strength can be enhanced to be high enough to be used as a ball for a bearing. The compressive stress layer can be formed easily by a strengthening treatment on the glass which has been once formed.

An air-cooling tempering method, a water-cooling tempering method (physically strengthening method) and a chemically strengthening method are common as typical strengthening treatment methods for forming a compressive stress layer in a surface of a glass ball. The air-cooling tempering method or the water-cooling tempering method (physically strengthening method) is a method in which a surface of a glass ball heated to the vicinity of a softening point thereof is cooled rapidly by air-cooling or water-cooling. On the other hand, the chemically strengthening method is a method in which alkali metal ions (typically Li ions or Na ions) having small ionic radii and existing in the surface of the glass ball are replaced by alkali metal ions (typically Na ions or Ki ions for the Li ions, or K ions for the Na ions) having larger ionic radii by ion exchange at a temperature equal to or lower than the glass transition point.

Since the glass ball used in the embodiment includes a compressive stress layer in its surface, a glass high in mechanical strength can be obtained. In the embodiment, a desired compressive stress layer may be formed by either of the strengthening methods. In order to obtain a glass ball having a thin thickness and a large compressive stress (CS) value, strengthening by the chemically strengthening method is preferred.

The strengthened properties (strengthened profile) of the chemically strengthened glass is generally expressed by a compressive stress (CS) formed in the surface, a depth of the compressive stress (DOL: Depth of Layer), and a tensile stress (CT: Central Tension) formed internally. Description is made below along an example in which the glass ball is a chemically strengthened glass.

In the glass ball in the embodiment, a compressive stress layer is formed in a surface thereof as described above. A compressive stress value ($CS_0$) in the surface of the compressive stress layer (the surface of the glass ball) (hereinafter also referred to as "surface compressive stress value" or simply "CS") is preferably 80 MPa or more, more preferably 200 MPa or more, even more preferably 400 MPa or more, and particularly preferably 600 MPa or more. As the surface compressive stress value ($CS_0$) is increased, the mechanical strength of the glass ball is increased. On the other hand, when the surface compressive stress value ($CS_0$) is excessively increased, there is a fear that the tensile stress inside the glass may be extremely increased. Therefore, the surface compressive stress value ($CS_0$) is preferably 1,500 MPa or less, more preferably 1,300 MPa or less, and even more preferably 1,100 MPa or less.

The depth of the compressive stress layer (DOL) formed in the surface of the glass ball is preferably 8 μm or more, more preferably 15 μm or more, even more preferably 25 μm or more, particularly preferably 50 μm or more, and most preferably 70 μm or more. On the other hand, when the DOL is excessively increased, there is a fear that the tensile stress inside the glass may be extremely increased. Therefore, the depth of the compressive stress layer (DOL) is preferably 500 μm or less, more preferably 300 μm or less, and even more preferably 200 μm or less.

The surface compressive stress value ($CS_0$) and depth of the compressive stress layer (DOL) of the glass ball can be obtained by measurement with a birefringence imaging system (tradename: Abrio, made by Tokyo Instruments, Inc.). The measurement may be carried out in such a manner that the glass ball is sliced to produce a glass piece having a thickness of about 0.2 mm and including the center of the glass ball, and a phase difference distribution inside the glass piece is measured.

The aforementioned method is a method for measuring the surface compressive stress value ($CS_0$) of the glass ball directly. However, the properties of the compressive stress layer of the glass ball may be evaluated in such a manner that a glass sheet formed of the same composition and having a predetermined thickness is subjected to a strengthening treatment in the same manner, and the $CS_0$ and DOL of the obtained glass sheet are measured.

The glass composition and properties of the glass ball in the embodiment are described above. When the glass ball is a glass ball for a bearing, the glass ball more preferably satisfies the following properties.

The Vickers hardness (Hvct) of the glass ball in the embodiment is preferably 6.0 GPa or more, and more preferably 6.5 GPa or more. The Vickers hardness (Hvct) in the present description is a Vickers hardness of a glass ball which has been subjected to a strengthening treatment. In addition, it is difficult to measure the Vickers hardness of an object to be measured when it has a ball-like shape. Therefore, a glass sheet having the same composition and having a predetermined thickness was subjected to a strengthening treatment in the same manner, and the Vickers hardness of the obtained glass sheet was measured. The measured Vickers hardness was regarded and evaluated as the property of the Vickers hardness (Hvct) of the glass ball. The Vickers hardness was measured in accordance with JIS Z 2244. For the measurement, a load with which the Vickers hardness was measured was set at 100 to 200 g so that the length of indentation was within a range of 50 to 300 µm.

The diameter of the glass ball in the embodiment is preferably within a range of 0.5 to 100 mm. As a ball for a bearing, the diameter thereof is preferably 0.5 mm or more, more preferably 1.0 mm or more, and even more preferably 1.5 mm or more. In addition, when the diameter is too small, it is difficult to perform a strengthening treatment on the surface of the glass ball within the range such that the desired properties are obtained. From this point, the aforementioned lower limit is preferred. On the other hand, likewise as a ball for a bearing, the diameter thereof is preferably about 100 mm or less, more preferably 90 mm or less, and even more preferably 80 mm or less. It is more preferable that the glass ball in the embodiment is higher in sphericity.

A method for manufacturing the glass ball in the embodiment can be obtained in such a manner that a sphere made of glass is produced by a common method in the background art, and a compressive stress layer is formed in the surface of the sphere by a strengthening treatment or the like.

That is, raw materials of respective components of the glass are mixed to obtain a specific composition satisfying the glass composition of the aforementioned glass material, followed by heating and melting in a glass melting furnace or the like. Then the glass is homogenized by a common method, followed by molding to obtain a sphere made of the glass. For example, the sphere made of the glass can have desired dimensions as follows. That is, the molten glass is cooled gradually, followed by shaping into a block-like glass lump, and the glass lump is then ground and polished into the sphere having the desired dimensions. Alternatively, the sphere made of the glass may be obtained by use of a forming die or the like. That is, the molten glass is poured into the forming die and cooled gradually, followed by molding into a rough ball, and then the rough ball is further polished into the sphere.

A strengthening treatment is applied to the surface of the obtained sphere made of the glass to form a compressive stress layer, and then, the glass ball in the embodiment is obtained. Examples of methods for the strengthening treatment include an air-cooling tempering method, a water-cooling tempering method (physically strengthening method), and a chemically strengthening method, as described above.

The chemically strengthening treatment is described specifically below. The chemically strengthening treatment can be carried out by a common method in the background art. The chemically strengthening treatment can be attained as follows. That is, a ball-like glass body is brought into contact with a melt of metal salt (such as potassium nitrate) containing metal ions (typically K ions) having large ionic radii by immersion or the like, so that metal ions (typically Na ions or Li ions) having small ionic radii in the glass are replaced by the metal ions having large ionic radii.

Although not limited particularly, the chemically strengthening treatment (ion exchange treatment) can be carried out as follows. For example, the ball-like glass body is immersed in molten salt of potassium nitrate or the like heated to 360 to 600° C., for 0.1 to 500 hours. The heated temperature of the molten salt is preferably 375 to 500° C., and the immersion time of the glass sheet in the molten salt is preferably 0.3 to 200 hours.

Examples of the molten salt for the chemically strengthening treatment include nitrates, sulfates, carbonates, chlorides, and the like. Among them, examples of the nitrates include lithium nitrate, sodium nitrate, potassium nitrate, cesium nitrate, silver nitrate, and the like. Examples of the sulfates include lithium sulfate, sodium sulfate, potassium sulfate, cesium sulfate, silver sulfate, and the like. Examples of the carbonates include lithium carbonate, sodium carbonate, potassium carbonate, and the like. Examples of the chlorides include lithium chloride, sodium chloride, potassium chloride, cesium chloride, silver chloride, and the like. Each of those molten salts may be used alone, or a plurality of kinds of them may be used in combination.

In the embodiment, the treatment conditions of the chemically strengthening treatment are not specified particularly. Suitable conditions may be selected in consideration of the properties and composition of the glass, the kind of the molten salt, and desired chemically strengthened properties such as the surface compressive stress (CS) and the depth of the compressive stress layer required in the glass ball obtained finally.

In addition, in the embodiment, the chemically strengthening treatment may be performed once, or a plurality of chemically strengthening treatment steps (multi-step strengthening) may be performed on two or more different sets of conditions. Here, for example, when a chemically strengthening treatment is performed as a first-step chemically strengthening treatment under conditions with which the CS is relatively low, and a chemically strengthening treatment is then performed as a second-step chemically strengthening treatment under conditions with which the CS is relatively high, it is possible to reduce the internal tensile stress area (St) while increasing the CS in the outermost surface of the chemically strengthened glass, and as a result, the internal tensile stress (CT) can be controlled to be low.

Second Embodiment

Next, a glass ball in a second embodiment is described. The glass ball described here is, of the glass ball in the first embodiment, a glass ball using a Li-based glass containing LiO$_2$ as a glass material having a more preferable glass composition and more preferable glass properties. The glass ball in the second embodiment is described in detail below.

Example of the Li-based glass used here include a glass containing, as represented by mole percentage based on oxides, 50 to 75% of SiO$_2$, 4 to 20% of Al$_2$O$_3$, 1 to 15% of Li$_2$O, 5 to 25% of R$_2$O (where R is at least one kind selected from Li, Na and K), and 0 to 15% of MgO, where SiO$_2$+Al$_2$O$_3$+R$_2$O+MgO is 92% or higher.

In the embodiment, the content of SiO$_2$ is preferably 50% or higher. The content of SiO$_2$ is more preferably 55% or higher, even more preferably 60% or higher, and particularly preferably 65% or higher. On the other hand, the content of SiO$_2$ is preferably 75% or lower, and more preferably 68% or lower.

The content of Al$_2$O$_3$ is preferably 4% or higher. The content of Al$_2$O$_3$ is more preferably 5% or higher, even more preferably 6% or higher, and particularly preferably 7% or higher. On the other hand, the content of Al$_2$O$_3$ is preferably 20% or lower, more preferably 15% or lower, even more preferably 12% or lower, and particularly preferably 10% or lower.

When the chemically strengthening treatment is performed so that Li ions in the glass surface are replaced by Na ions, the content of Li$_2$O is preferably 1% or higher, more preferably 2% or higher, even more preferably 3% or higher, particularly preferably 5% or higher, and most preferably 7% or higher. On the other hand, the content of Li$_2$O is preferably 15% or lower, more preferably 12% or lower, and even more preferably 10% or lower.

The content of R$_2$O (where R is at least one kind selected from Li, Na and K) is 5% or higher, preferably 8% or higher, more preferably 10% or higher, and even more preferably 12% or higher. On the other hand, the content of R$_2$O is preferably 25% or lower, more preferably 20% or lower, and even more preferably 18% or lower.

The content of MgO is 0 to 15%, preferably 0.1% or higher, more preferably 1% or higher, even more preferably 3% or higher, and particularly preferably 5% or higher. On the other hand, the content of MgO is preferably 15% or lower, more preferably 14% or lower, even more preferably 11% or lower, and particularly preferably 9% or lower.

In the Li-based glass in the embodiment, the total content of the aforementioned components (SiO$_2$+Al$_2$O$_3$+R$_2$O+MgO) is preferably set at 92% or higher in order to attain large Young's modulus, sufficient strength and abrasion resistance while keeping the density low. The total content of those components is more preferably 95% or higher, and even more preferably 97% or higher.

In addition, optional components may be contained in the same manner as in the first embodiment.

In the Li-based glass in the embodiment, the total content of ZrO and TiO$_2$ (ZrO+TiO$_2$) is preferably 0 to 2% in order to retain the abrasion resistance and prevent the glass quality from deteriorating due to devitrification during melting. The total content (ZrO+TiO$_2$) is preferably 0.1% or higher, more preferably 0.15% or higher, and even more preferably 0.2% or higher. On the other hand, the total content (ZrO+TiO$_2$) is more preferably 1.5% or lower, and even more preferably 1% or lower.

The Li-based glass having the aforementioned composition serves as a glass material low in density, high in strength and high in Young's modulus. The Li-based glass is suitable particularly for a light-weight and high-strength glass bearing ball. The Li-based glass tend to have the glass properties within the following ranges.

The density of the Li-based glass is preferably 2.3 to 2.5 g/cm$^3$. The density is more preferably 2.35 g/cm$^3$ or more, and even more preferably 2.42 g/cm$^3$ or more. On the other hand, the density is more preferably 2.47 g/cm$^3$ or less, and even more preferably 2.45 g/cm$^3$ or less.

The Young's modulus of the Li-based glass is preferably 75 to 95 GPa. The Young's modulus is more preferably 80 GPa or more, and more preferably 90 GPa or less.

The average coefficient of thermal expansion (coefficient α of linear expansion) at 50 to 350° C. is preferably 50×10$^{-7}$ to 90×10$^{-7}$/° C. The average coefficient of thermal expansion is more preferably 60×10$^{-7}$/° C. or more, and even more preferably 70×10$^{-7}$/° C. or more. On the other hand, the average coefficient of thermal expansion is more preferably 85×10$^{-7}$/° C. or less, and even more preferably 75×10$^{-7}$/° C. or less.

The surface compressive stress value (CS$_0$) of the Li-based glass is preferably 80 MPa or more, and more preferably 120 MPa or more. On the other hand, the surface compressive stress value (CS$_0$) is preferably 1,500 MPa or less, and more preferably 1,300 MPa or less. The surface compressive stress value (CS$_0$) of the Li-based glass can be enhanced easily by the strengthening treatment. The surface compressive stress value (CS$_0$) after the strengthening treatment is preferably 400 MPa or more, and more preferably 600 MPa or more. On the other hand, the surface compressive stress value (CS$_0$) after the strengthening treatment is preferably 1,100 MPa or less, and more preferably 900 MPa or less.

Third Embodiment

Next, a glass ball in a third embodiment is described. The glass ball described here is, of the glass ball in the first embodiment, a glass ball using a Y$_2$O$_3$-based glass containing Y$_2$O$_3$ as a glass material having a more preferable glass composition and more preferable glass properties. The glass ball in the third embodiment is described in detail below.

Examples of the Y$_2$O$_3$-based glass used here include a glass containing, as represented by mole percentage based on oxides, 30 to 70% of SiO$_2$, 4 to 30% of Al$_2$O$_3$, 5 to 20% of Li$_2$O, 5 to 25 mol % of R$_2$O (where R is at least one kind selected from Li, Na and K), 1 to 25% of MgO, and 1 to 20% of Y$_2$O$_3$.

In the embodiment, the content of SiO$_2$ is preferably 30% or higher. The content of SiO$_2$ is more preferably 35% or higher, and even more preferably 38% or higher. On the other hand, the content of SiO$_2$ is preferably 70% or lower, and more preferably 65% or lower.

The content of Al$_2$O$_3$ is preferably 4% or higher. The content of Al$_2$O$_3$ is more preferably 5% or higher, even more preferably 10% or higher, and particularly preferably 15% or higher. On the other hand, the content of Al$_2$O$_3$ is preferably 30% or lower, and more preferably 27% or lower.

When the chemically strengthening treatment is performed so that Li ions in the glass surface are replaced by Na ions, the content of Li$_2$O is preferably 5% or higher, and more preferably 7% or higher. On the other hand, the content of Li$_2$O is preferably 20% or lower, and more preferably 17% or lower.

The content of R$_2$O (where R is at least one kind selected from Li, Na and K) is 5% or higher, preferably 8% or higher, more preferably 10% or higher, and even more preferably 12% or higher. On the other hand, the content of R$_2$O is preferably 25% or lower, more preferably 20% or lower, and even more preferably 18% or lower.

The content of MgO is 1 to 25%, preferably 2% or higher, and more preferably 3% or higher. On the other hand, the content of MgO is preferably 20% or lower, more preferably 17% or lower, and even more preferably 15% or lower.

$Y_2O_3$ is a component that increases the Young's module without making the density so high, to thereby improve the abrasion resistance. The content of $Y_2O_3$ is 1 to 20%, preferably 2% or higher, and more preferably 3% or higher. On the other hand, when the content of $Y_2O_3$ exceeds 20%, the acid resistance of the glass is lowered, or the devitrification temperature is increased. The content of $Y_2O_3$ is preferably 20% or lower, more preferably 11% or lower, and even more preferably 9% or lower.

In addition, optional components may be contained in the same manner as in the first embodiment.

In the $Y_2O_3$-based glass in the embodiment, the total content of $ZrO$ and $TiO_2$ ($ZrO+TiO_2$) is preferably 0 to 2% in order to retain the abrasion resistance and prevent the glass quality from deteriorating due to devitrification during melting. The total content ($ZrO+TiO_2$) is preferably 0.1% or higher, more preferably 0.15% or higher, and even more preferably 0.2% or higher. On the other hand, the total content ($ZrO+TiO_2$) is more preferably 1.5% or lower, and even more preferably 1% or lower.

The $Y_2O_3$-based glass having the aforementioned composition serves as a glass material high in strength and high in hardness. The $Y_2O_3$-based glass is suitable particularly for a high-durability and high-strength glass bearing ball, and excellent in abrasion resistance. The glass properties of the $Y_2O_3$-based glass are preferably within the following ranges.

The density ($\rho$) of the $Y_2O_3$-based glass is preferably 2.3 to 3.2 g/cm$^3$. The density is more preferably 2.6 g/cm$^3$ or more, and more preferably 2.8 g/cm$^3$ or more. On the other hand, the density is more preferably 3.1 g/cm$^3$ or less.

The Young's modulus of the $Y_2O_3$-based glass is preferably 80 to 150 GPa. The Young's modulus is more preferably 90 GPa or more, and more preferably 130 GPa or less, even more preferably 125 GPa or less, and particularly preferably 120 GPa or less.

In the $Y_2O_3$-based glass, the average coefficient of thermal expansion (coefficient $\alpha$ of linear expansion) at 50 to 350° C. is preferably $40\times10^{-7}$ to $90\times10^{-7}$/° C. The average coefficient of thermal expansion is more preferably $50\times10^{-7}$/° C. or more, and even more preferably $55\times10^{-7}$/° C. or more. On the other hand, the average coefficient of thermal expansion is more preferably $85\times10^{-7}$/° C. or less, and even more preferably $80\times10^{-7}$/° C. or less.

The Vickers hardness (Hv) of the $Y_2O_3$-based glass is preferably 6.0 GPa or more, and more preferably 6.5 GPa or more. The Vickers hardness of the $Y_2O_3$-based glass can be further increased easily by the strengthening treatment. The Vickers hardness (Hvct) after the strengthening treatment is preferably 7.0 GPa or more, and more preferably 7.5 GPa or more.

EXAMPLES

The present invention is described along its examples below. However, the present invention is not limited to the description of those examples. As for measurement results in tables, blanks means unmeasured items.
(Cases 1 to 14; Manufacturing of Chemically Strengthened Glass)

Glass balls were manufactured by melting in a platinum crucible in the following procedure respectively to have glass compositions represented by mole percentage (mol %) based on oxides as shown in Tables 1 to 2.

First, glass raw materials used generally, such as oxides, hydroxides, carbonates, nitrates, and the like were selected suitably, and weighed to be 1,000 g as a glass. Next, the mixed raw materials were put into a platinum crucible, and thrown into a resistance heating type electric furnace at 1,500 to 1,700° C. Thus, the glass raw materials were melted, degassed and homogenized for about 3 hours. The obtained molten glass was poured into a mold, and retained at a temperature of the glass transition point+50° C. for 1 hour. After that, the molten glass was cooled down to a room temperature at a rate of 0.5° C./min. Thus, a glass block was obtained. The obtained glass block was cut, ground, and processed so that the surface was mirror-finished. Thus, a glass ball having a diameter of 4 mm was obtained.

Next, a chemically strengthening treatment was performed on each of glass balls obtained thus, so as to form a compressive stress layer therein. Thus, a glass ball with a compressive stress layer was obtained. Here, the chemically strengthening treatment was performed under the following conditions.

In Case 1, the chemically strengthening treatment was performed under two sets of the conditions: the first set of the conditions includes 100% NaNO$_3$, 450° C., and 4 hours; and the second set of the conditions following the first set of the conditions includes 100% KNO$_3$, 450° C., and 6 hours. On each of the glasses in Cases 2 to 6, the chemically strengthening treatment was performed under one set of the conditions including 100% NaNO$_3$, 500° C., and 15 hours. On each of the glasses in Cases 7 and 9, the chemically strengthening treatment was performed under two sets of the conditions: the first set of the conditions includes 100% NaNO$_3$, 450° C., and 3 hours; and the second set of the conditions following the first set of the conditions includes 100% KNO$_3$, 450° C., and 1.5 hours. On the glass in Case 8, the chemically strengthening treatment was performed under the conditions including mixed molten salt of 80% KNO$_3$ and 20% NaNO$_3$, 450° C., and 1.5 hours. On the glass in Case 10, the chemically strengthening treatment was performed under two sets of the conditions: the first set of the conditions includes 100% NaNO$_3$, 450° C., and 1.5 hours; and the second set of the conditions following the first set of the conditions includes 100% KNO$_3$, 450° C., and 1.5 hours. On each of the glasses in Cases 11 and 12, the chemically strengthening treatment was performed under one set of the conditions including 100% KNO$_3$, 425° C., and 6 hours. On each of the glasses in Cases 13 and 14, the chemically strengthening treatment was performed under one set of the conditions including 99.5% KNO$_3$, 435° C., and 220 minutes. Thus, chemically strengthened glass balls were obtained.

[Evaluation of Properties]

For the properties of each chemically strengthened glass ball, a sheet-like glass having the same composition was subjected to the strengthening treatment in the same manner, and the properties of the sheet-like glass were measured, as follows. The measured properties were regarded as equivalent to the properties of the glass ball. The properties are shown in the following Tables 1 to 4. As for Vickers hardness, CS$_0$ and DOL of each glass ball before the strengthening treatment, results of evaluation of a sheet-like glass corresponding thereto (a sheet-like glass having the same composition and not subjected to the strengthening treatment) are also shown.

For the glass in Case 1, a sheet-like glass having a thickness of 0.8 mm was prepared, and the chemically strengthening treatment was performed under two sets of the conditions: the first set of the conditions includes 100% $NaNO_3$, 450° C., and 4 hours; and the second set of the conditions following the first set of the conditions includes 100% $KNO_3$, 450° C., and 6 hours.

On each of the glasses in Cases 2 to 6, the chemically strengthening treatment was performed under one set of the conditions including 100% $NaNO_3$, 500° C., and 15 hours. On each of the glasses in Cases 7 and 9, the chemically strengthening treatment was performed under two sets of the conditions: the first set of the conditions includes 100% $NaNO_3$, 450° C., and 3 hours; and the second set of the conditions following the first set of the conditions includes 100% $KNO_3$, 450° C., and 1.5 hours. On the glass in Case 8, the chemically strengthening treatment was performed under the conditions including mixed molten salt of 80% $KNO_3$ and 20% $NaNO_3$, 450° C., and 1.5 hours. On the glass in Case 10, the chemically strengthening treatment was performed under two sets of the conditions: the first set of the conditions includes 100% $NaNO_3$, 450° C., and 1.5 hours; and the second set of the conditions following the first set of the conditions includes 100% $KNO_3$, 450° C., and 1.5 hours. On each of the glasses in Cases 11 and 12, the chemically strengthening treatment was performed under one set of the conditions including 100% $KNO_3$, 425° C., and 6 hours. On each of the glasses in Cases 13 and 14, the chemically strengthening treatment was performed under one set of the conditions including 99.5% $KNO_3$, 435° C., and 220 minutes. Thus, chemically strengthened sheet-like glasses for evaluation of properties were obtained in the same operation as in Case 1 except for the aforementioned conditions. The obtained sheet-like glasses were evaluated as to the following properties. The evaluation results are shown in Tables 1 to 4.

<Density (ρ)>
The density was measured by the method of weighing in liquid (JIS Z 8807:2012 Method for Measuring Density and Specific Weight of Solid). The unit is $g/cm^3$.

<Young's Modulus (E)>
The Young's modulus E (in units of GPa) of the glass which had not been chemically strengthened was measured by the ultrasonic pulse method (JIS R 1602:1995).

<Vickers Hardness (Hv)>
The Vickers hardness Hv (in units of GPa) before the chemical strengthening was measured with a load of 100 gf in accordance with the method of "Vickers Hardness Test and Testing Method" in JIS Z 2244:2009.

<Glass Transition Point (Tg)>
The glass transition point Tg (in units of ° C.) was measured by use of TMA in accordance with the method prescribed in JIS R 3103-3:2001.

<Coefficient (α) of Linear Expansion>
The coefficient α ($α^{50-350}$) of linear expansion was measured in accordance with the method of "Testing Method of Average Coefficient of Linear Expansion of Glass" in JIS R 3102:1995.

<CS and DOL>
The surface compressive stress CS (in units of MPa) was measure by a surface stress meter FSM-6000 made by Orihara Manufacturing Co., LTD. As for each of the glasses in Cases 1 and 2, the DOL was measured by the method using Abrio-IM and a thin piece sample. As for each of the glasses in Cases 3 to 10, the DOL was measured by measuring machine SLP1000 made by Orihara Manufacturing Co., LTD. and using scattered-light photoelasticity. As for each of the glasses in Cases 11 to 14, the DOL was measured by the FMS-6000.

TABLE 1

|  |  | Case 1 | Case 2 | Case 3 | Case 4 | Case 5 | Case 6 | Case 7 |
|---|---|---|---|---|---|---|---|---|
| Composition [mol %] | $SiO_2$ | 64 | 40 | 40 | 40 | 40 | 40 | 70 |
|  | $Al_2O_3$ | 6 | 25 | 25 | 25 | 25 | 25 | 7.5 |
|  | $B_2O_3$ |  |  |  |  |  | 5 |  |
|  | $P_2O_5$ |  |  |  |  | 5 |  |  |
|  | $Li_2O$ | 16 | 10 | 10 | 15 | 15 | 15 | 8 |
|  | $Na_2O$ |  |  | 5 | 5 |  |  | 5.3 |
|  | $K_2O$ |  |  |  |  |  |  | 1 |
|  | MgO | 6 | 15 | 10 | 5 | 5 | 5 | 7 |
|  | CaO |  |  |  |  |  |  | 0.2 |
|  | SrO |  |  |  |  |  |  |  |
|  | BaO |  |  |  |  |  |  |  |
|  | ZnO |  |  |  |  |  |  |  |
|  | $TiO_2$ |  |  |  |  |  |  |  |
|  | $ZrO_2$ | 2 | 2 | 2 | 2 | 2 | 2 | 1 |
|  | $Y_2O_3$ | 6 | 8 | 8 | 8 | 8 | 8 |  |
| Properties | Density (ρ) [$g/cm^3$] | 2.85 | 3.03 | 3.03 | 2.98 | 2.97 | 2.97 | 2.44 |
|  | Young's modulus (E) | 102.7 | 120.3 | 115.1 | 111.6 | 114.1 | 108.5 | 82.6 |
|  | Vickers hardness (Hv) [GPa] | 7.1 | 8.1 | 8 | 7.7 | 7.6 | 7.2 | 6.1 |
|  | Coefficient ($α^{50-350}$) of linear expansion [$×10^{-7}$/° C.] | 70 | 61 | 72 | 75 | 66 | 63 | 72 |
|  | Glass transition point (Tg) [° C.] | 600 | 690 | 660 | 640 | 650 | 690 | 550 |

TABLE 2

|  |  | Case 8 | Case 9 | Case 10 | Case 11 | Case 12 | Case 13 | Case 14 |
|---|---|---|---|---|---|---|---|---|
| Composition [mol %] | $SiO_2$ | 64.1 | 69 | 70 | 64.5 | 67.1 | 68.8 | 71.1 |
|  | $Al_2O_3$ | 15.4 | 9 | 7.5 | 8 | 13.1 | 2.9 | 1.1 |
|  | $B_2O_3$ |  |  |  |  | 3.6 |  |  |
|  | $P_2O_5$ | 2.5 |  |  |  |  |  |  |
|  | $Li_2O$ | 6.2 | 9.5 | 8 |  |  |  |  |
|  | $Na_2O$ | 10.7 | 4.5 | 5.3 | 12.5 | 13.7 | 14.2 | 12.4 |
|  | $K_2O$ |  | 1 | 1 | 4 | 0.1 | 0.1 | 0.2 |

TABLE 2-continued

|  |  | Case 8 | Case 9 | Case 10 | Case 11 | Case 12 | Case 13 | Case 14 |
|---|---|---|---|---|---|---|---|---|
|  | MgO |  | 6 | 7 | 10.6 | 2.3 | 6.1 | 6.9 |
|  | CaO |  |  | 0.2 | 0.1 |  | 7.8 | 8.3 |
|  | SrO |  |  |  | 0.1 |  |  |  |
|  | BaO |  |  |  | 0.1 |  |  |  |
|  | ZnO | 1.1 |  |  |  |  |  |  |
|  | $TiO_2$ |  | 0.04 | 0.04 |  |  |  |  |
|  | $ZrO_2$ |  | 1 | 1 | 0.1 |  |  |  |
|  | $Y_2O_3$ |  |  |  |  |  |  |  |
| Properties | Density (ρ) [g/cm³] | 2.42 | 2.44 | 2.44 | 2.48 | 2.39 | 2.5 | 2.5 |
|  | Young's modulus (E) | 76.7 | 84 | 82.6 | 74 | 69 | 71 | 71 |
|  | Vickers hardness (Hv) [GPa] | 6.0 | 6.3 | 6.3 | 5.6 | 6.3 | 5.3 | 5.3 |
|  | Coefficient ($\alpha^{50-350}$) of linear expansion [×$10^{-7}$/° C.] | 82 | 70 | 72 | 98 | 79 | 92 | 89 |
|  | Glass transition point (Tg) [° C.] | 630 | 550 | 550 | 604 | 640 | 550 | 550 |

TABLE 3

|  |  | Case 1 | Case 2 | Case 3 | Case 4 | Case 5 | Case 6 | Case 7 |
|---|---|---|---|---|---|---|---|---|
| Properties after chemically strengthening treatment | Chemically strengthening treatment conditions | (1) $NaNO_3$: 100%, 450° C., 4 hours (2) $KNO_3$; 100%, 450° C., 6 hours | $NaNO_3$: 100%, 500° C., 15 hours | | | | | (1) $NaNO_3$: 100%, 450° C., 3 hours (2) $KNO_3$; 100%, 450° C., 1.5 hours |
|  | $CS_0$ [MPa] | 600 | 580 | 680 | 830 | 1130 | 1200 | 900 |
|  | DOL [μm] | 110 | 10 | 90 | 145 | 60 | 70 | 110 |
|  | Vickers hardness after chemical strengthening (Hvct) [GPa] | 7.8 | 9.1 | 8.3 | 8.1 | 8.2 | 8.0 | 6.8 |

TABLE 4

|  |  | Case 8 | Case 9 | Case 10 | Case 11 | Case 12 | Case 13 | Case 14 |
|---|---|---|---|---|---|---|---|---|
| Properties after chemically strengthening treatment | Chemically strengthening treatment conditions | KNO3: 80% $NaNO_3$: 20%, 450° C., 1.5 hours | (1) $NaNO_3$: 100%, 450° C., 3 hours (2) $KNO_3$; 100%, 450° C., 1.5 hours | (1) $NaNO_3$: 100%, 450° C., 1.5 hours (2) $KNO_3$; 100%, 450° C., 1.5 hours | $KNO_3$: 100%, 425° C., 6 hours | | $KNO_3$: 99.5%, 435° C., 200 min | |
|  | $CS_0$ [MPa] | 730 | 900 | 950 | 880 | 880 | 640 | 565 |
|  | DOL [μm] | 120 | 170 | 140 | 49 | 45 | 12.2 | 9.8 |
|  | Vickers hardness after chemical strengthening (Hvct) [GPa] | 6.4 | 6.8 | 6.8 | 6.3 | 6.5 | 5.8 | 5.8 |

From the aforementioned results, in each of Cases 1 to 13, the surface compressive stress CS of the glass ball including a compressive stress layer is 580 MPa or more. The surface of the glass ball is subjected to the strengthening treatment, and the strength is excellent. In addition, in each of Cases 1 to 6, the Vickers hardness Hvct is 7.0 (GPa) or more. The glass ball is excellent in abrasion resistance, and suitable particularly as a ball for a bearing. In addition, in each of Cases 7 to 12, the density is 2.49 or less. The weight of the glass ball can be reduced, and the glass ball is suitable particularly as a ball for a bearing.

The invention claimed is:
1. A glass ball, having:
a density of 2.3 to 3.2 g/cm³;
a Young's modulus of 60 to 150 GPa; and
an average coefficient of thermal expansion at 50 to 350° C. being 40×$10^{-7}$ to 120×$10^{-7}$/° C.,
the glass ball being formed of a glass material comprising, as represented by mole percentage based on oxides, 30 to 75 mol % of $SiO_2$, 2 to 30 mol % of $Al_2O_3$, and 5 to 25 mol % of $R_2O$, wherein R is at least one kind selected from Li, Na and K, and
the glass ball comprising a compressive stress layer in a surface thereof.
2. The glass ball according to claim 1, wherein the compressive stress layer has a depth (DOL) of 8 to 500 μm.
3. The glass ball according to claim 1, wherein the glass material is a Li-based glass comprising, as represented by mole percentage based on oxides, 50 to 75 mol % of $SiO_2$, 4 to 20 mol % of $Al_2O_3$, 1 to 15 mol % of $Li_2O$, 5 to 25 mol % of $R_2O$, and 0 to 15 mol % of MgO, wherein R is at least one kind selected from Li, Na and K, and $SiO_2+Al_2O_3+R_2O+MgO$ is 92 mol % or higher.
4. The glass ball according to claim 1, wherein the glass material is a $Y_2O_3$-based glass comprising, as represented by mole percentage based on oxides, 30 to 70 mol % of $SiO_2$, 4 to 30 mol % of $Al_2O_3$, 5 to 20 mol % of $Li_2O$, 5 to 25 mol % of $R_2O$, 1 to 25 mol % of MgO, and 1 to 20 mol % of $Y_2O_3$, wherein R is at least one kind selected from Li, Na and K.

5. The glass ball according to claim 1, having a surface compressive stress value ($CS_0$) of 200 to 1,500 MPa.

6. The glass ball according to claim 1, having a Vickers hardness (Hvct) of 6.0 GPa or more.

7. The glass ball according to claim 1, having a diameter of 0.5 to 100 mm.

8. The glass ball according to claim 1, wherein a molar ratio of an amount of $Li_2O$ to $R_2O$ is at least 0.56.

9. The glass ball according to claim 1, wherein a molar ratio of an amount of $Li_2O$ to $R_2O$ is at least 0.63.

10. The glass ball according to claim 1, wherein a molar ratio of an amount of $Li_2O$ to $R_2O$ is at least 0.75.

* * * * *